(12) United States Patent
Gondoh et al.

(10) Patent No.: US 10,589,942 B2
(45) Date of Patent: Mar. 17, 2020

(54) ARTICLE LOADING FACILITY

(71) Applicant: Daifuku Co., Ltd., Osaka-shi (JP)

(72) Inventors: Takuya Gondoh, Tokyo (JP); Shigeru Sugano, Hinocho (JP); Atsushi Kurayama, Tokyo (JP); Masami Iwai, Tokyo (JP); Atsushi Minoo, Tokyo (JP)

(73) Assignee: Daifuku Co., Ltd., Osaka-shi (JP)

( * ) Notice: Subject to any disclaimer, the term of this patent is extended or adjusted under 35 U.S.C. 154(b) by 44 days.

(21) Appl. No.: 15/696,632

(22) Filed: Sep. 6, 2017

(65) Prior Publication Data

US 2018/0065818 A1 Mar. 8, 2018

(30) Foreign Application Priority Data

Sep. 7, 2016 (JP) .................................. 2016-174927

(51) Int. Cl.
*B65G 57/04* (2006.01)
*B65G 60/00* (2006.01)
*B65G 65/00* (2006.01)

(52) U.S. Cl.
CPC ............. *B65G 60/00* (2013.01); *B65G 57/04* (2013.01); *B65G 65/005* (2013.01); *B65G 2814/0302* (2013.01)

(58) Field of Classification Search
CPC ........ B65G 57/03; B65G 57/16; B65G 57/22; B65G 65/005; B65G 60/00;
(Continued)

(56) References Cited

U.S. PATENT DOCUMENTS 4,692,876 A * 9/1987 Tenma ................. B65G 1/1371
414/791.6
4,835,450 A * 5/1989 Suzuki .................. B25J 9/1679
318/568.13
(Continued)

FOREIGN PATENT DOCUMENTS

JP 201540120 A 3/2015
WO WO-2014064593 A1 * 5/2014 ............. B65G 47/24
(Continued)

*Primary Examiner* — Gregory W Adams
(74) *Attorney, Agent, or Firm* — The Webb Law Firm

(57) ABSTRACT

A control unit performs first loading control that is to be performed when a target article that has been determined by a determination unit as being an article that is in an appropriate orientation is to be loaded onto a first supporting member in the appropriate orientation, and second loading control that is to be performed when a target article that has been determined by the determination unit as being an article that is in an inappropriate orientation is to be loaded onto the first supporting member in the appropriate orientation. The first loading control is performed to control a loading operation unit to suck and support a first sucking-target surface of a target article that is supported by the second supporting member, from above, then move a sucking portion, and thereafter release the target article from the state of being sucked by the sucking portion, and the second loading control is performed to control the loading operation unit to perform an orientation changing operation, and thereafter release the target article from the state of being sucked by the sucking portion when the target article is located immediately above the first supporting member and the first sucking-target surface faces upward.

5 Claims, 6 Drawing Sheets

(58) Field of Classification Search
CPC ............ B65G 2814/0302; B65G 57/04; B65G 1/0421; B65G 1/1378; B65G 2203/0225; B65G 47/24
USPC ...... 414/783, 788.1, 788.5, 792.9, 793, 799; 700/217, 218
See application file for complete search history.

(56) References Cited

U.S. PATENT DOCUMENTS

| | | | | |
|---|---|---|---|---|
| 5,102,283 A * | 4/1992 | Balzola Elorza | .... | B65G 1/1375 414/404 |
| 5,175,692 A * | 12/1992 | Mazouz | ................. | B65G 61/00 414/900 |
| 5,203,671 A * | 4/1993 | Cawley | ................. | B65B 11/008 414/791.6 |
| 5,501,571 A * | 3/1996 | Van Durrett | ........... | B65G 61/00 414/21 |
| 7,210,894 B2 * | 5/2007 | Huang | ................... | B65G 47/90 414/21 |
| 8,489,229 B2 * | 7/2013 | Kuehnemann | ......... | B65G 57/00 700/213 |
| 9,387,992 B2 * | 7/2016 | Boschi | ................. | B25J 15/0052 |
| 2013/0110280 A1 * | 5/2013 | Folk | ....................... | B65G 1/137 700/215 |
| 2013/0282165 A1 * | 10/2013 | Pankratov | ............ | G06Q 10/043 700/217 |
| 2014/0199150 A1 * | 7/2014 | Razumov | ................. | B65B 35/18 414/752.1 |
| 2014/0277694 A1 * | 9/2014 | Ichimaru | ................. | B65G 1/137 700/218 |
| 2016/0075521 A1 * | 3/2016 | Puchwein | ............ | B65G 1/1378 700/218 |
| 2016/0096643 A1 * | 4/2016 | Baylor | ................. | B25J 15/0616 53/443 |
| 2016/0347545 A1 * | 12/2016 | Lindbo | ................. | B65G 61/00 |

FOREIGN PATENT DOCUMENTS

| | | | | |
|---|---|---|---|---|
| WO | WO-2014166650 A1 * | 10/2014 | ........... | B65G 1/1378 |
| WO | WO-2015118171 A1 * | 8/2015 | ............. | B65G 61/00 |

* cited by examiner

ARTICLE LOADING FACILITY

CROSS-REFERENCE TO RELATED APPLICATION

This application claims priority to Japanese Patent Application No. 2016-174927 filed Sep. 7, 2016, the disclosure of which is hereby incorporated in its entirety by reference.

BACKGROUND OF THE INVENTION

Field of the Invention

The present invention relates to an article loading facility that includes: a loading operation unit that performs an operation to load a plurality of target articles onto one first supporting member; and a control unit that controls the loading operation unit, wherein the control unit controls the loading operation unit so that the plurality of target articles are loaded onto the first supporting member, according to arrangement information that indicates the orientation and the position of each of the plurality of target articles relative to the first supporting member.

Description of the Related Art

An example of the above-described article loading facility is disclosed in JP 2015-040120A (Patent Document 1). According to the article loading facility disclosed in Patent Document 1, a transfer robot (the loading operation unit) includes: a sucking portion that sucks and supports a surface of a target article that is supported by a transport conveyer (a second supporting member); and an operation portion that moves the sucking portion. Using the sucking portion, the transfer robot supports a sucking-target surface, which faces upward, of an article that is supported by the transport conveyer, then moves the sucking portion, and thereafter releases the target article from the state of being sucked by the sucking portion when the target article is located immediately above a cage cart and the sucking-target surface faces upward. Thus, the transfer robot loads the target article onto the cage cart (the first supporting member).

SUMMARY OF THE INVENTION

According to the article loading facility disclosed in the above-described Patent Document 1, the orientation of the target article when loaded onto the cage cart is defined as an appropriate orientation, and the transfer robot loads the target article that is supported by the transport conveyer in the appropriate orientation onto the cage cart, while keeping the appropriate orientation.

However, if the orientation of the target article that is supported by the transport conveyer is different from the appropriate orientation due to the orientation having been lost while the target article is transported by the transport conveyer, for example, there are cases where the transfer robot cannot appropriately support the target article, and even if the transfer robot can support the target article, there are cases where the transfer robot cannot load the target article onto the cage cart according to the arrangement information. If the transfer robot cannot load the target article onto the cage cart according to the arrangement information, loading control is interrupted. Thus, there are cases where the transfer robot cannot smoothly load a plurality of target articles onto the first supporting member.

Therefore, there is demand for an article loading facility that can smoothly load target articles onto the first supporting member according to the arrangement information even if the orientation of a target article on the second supporting member is different from the appropriate orientation.

An article loading facility according to the present disclosure includes: a loading operation unit that loads a plurality of target articles onto one first supporting member; and a control unit that controls the loading operation unit, wherein the control unit controls the loading operation unit so that the plurality of target articles are loaded onto the first supporting member according to arrangement information that indicates the orientation and the position of each of the plurality of target articles relative to the first supporting member, a surface of a target article that faces downward when the target article is in the orientation indicated by the arrangement information is defined as a support-target surface, a surface of a target article that faces upward when the target article is in the orientation indicated by the arrangement information is defined as a first sucking-target surface, and an article that is in an orientation in which the support-target surface faces downward is defined as an article that is in an appropriate orientation, the loading operation unit includes: a sucking portion that sucks and supports a surface of a target article that is supported by a second supporting member; and an operation portion that moves the sucking portion, the article loading facility further comprises: a detection unit that detects the orientation of a target article that is supported by the second supporting member; and a determination unit that determines whether an article that is supported by the second supporting member is an article that is in the appropriate orientation or an article that is in an inappropriate orientation that is not the appropriate orientation, based on detection information obtained by the detection unit, the control unit performs first loading control that is to be performed when a target article that has been determined by the determination unit as being an article that is in the appropriate orientation is to be loaded onto the first supporting member in the appropriate orientation, and second loading control that is to be performed when a target article that has been determined by the determination unit as being an article that is in the inappropriate orientation is to be loaded onto the first supporting member in the appropriate orientation, the first loading control is performed to control the loading operation unit to suck and support the first sucking-target surface of a target article that is supported by the second supporting member, from above, then move the sucking portion, and thereafter release the target article from the state of being sucked by the sucking portion when the target article is located immediately above the first supporting member and the first sucking-target surface faces upward, and the second loading control is performed to control the loading operation unit to suck and support a second sucking-target surface, which faces upward, of a target article that is supported by the second supporting member, from above, then move the sucking portion so that the sucking portion performs an orientation changing operation to change the orientation of the target article from the inappropriate orientation to the appropriate orientation and change a surface that is to be sucked by the sucking portion from the second sucking-target surface to the first sucking-target surface, and thereafter release the target article from the state of being sucked by the sucking portion when the target article is located immediately above the first supporting member and the first sucking-target surface faces upward.

With this configuration, if a target article is on the second supporting member in the appropriate orientation, a surface of the target article that is supported by the second supporting member, the surface facing upward, is the first sucking-target surface. Also, since the target article is loaded onto the first supporting member in the appropriate orientation, a surface of the target article on the first supporting member, the surface facing upward, is the first sucking-target surface.

Therefore, if a target article that is to be taken out of the second supporting member is supported by the second supporting member in the appropriate orientation, the control unit performs the first loading control to suck the first sucking-target surface, which faces upward, of the target article that is supported by the second supporting member, from above, then take the target article out of the second supporting member, and load the target article onto the first supporting member while keeping the appropriate orientation, and thus the target article can be loaded onto the first supporting member according to the arrangement information.

If a target article that is to be taken out of the second supporting member is supported by the second supporting member in the inappropriate orientation, if the target article that is supported by the second supporting member in the inappropriate orientation is taken out and the target article thus taken out is loaded onto the first supporting member while keeping the inappropriate orientation, the target article is loaded onto the first supporting member in an orientation that is different from the orientation that is indicated by the arrangement information. Therefore, if the target article that is to be taken out of the second supporting member is an article that is in the inappropriate orientation, the control unit performs the second loading control. In the second loading control, the orientation changing operation is performed first to suck the second sucking-target surface, which faces upward, of the target article that is supported by the second supporting member in the inappropriate orientation, change the orientation of the target article from the inappropriate orientation to the appropriate orientation, and change the surface that is to be sucked by the sucking portion from the second sucking-target surface to the first sucking-target surface. Next, the target article of which the orientation has been changed to the appropriate orientation is loaded onto the first supporting member. Thus, the target article can be loaded onto the first supporting member according to the arrangement information.

In this way, in the case where a target article that is supported by the second supporting member is in the inappropriate orientation as well as the case where a target article that is supported by the second supporting member is in the appropriate orientation, the target article that is supported by the second supporting member can be loaded onto the first supporting member according to the arrangement information. Therefore, it is possible to smoothly load target articles onto the first supporting member according to the arrangement information even if the orientation of a target article that is supported by the second supporting member is different from the appropriate orientation.

DETAILED DESCRIPTION OF PREFERRED EMBODIMENTS

The following describes embodiments of an article loading facility with reference to the drawings.

Figure 1:
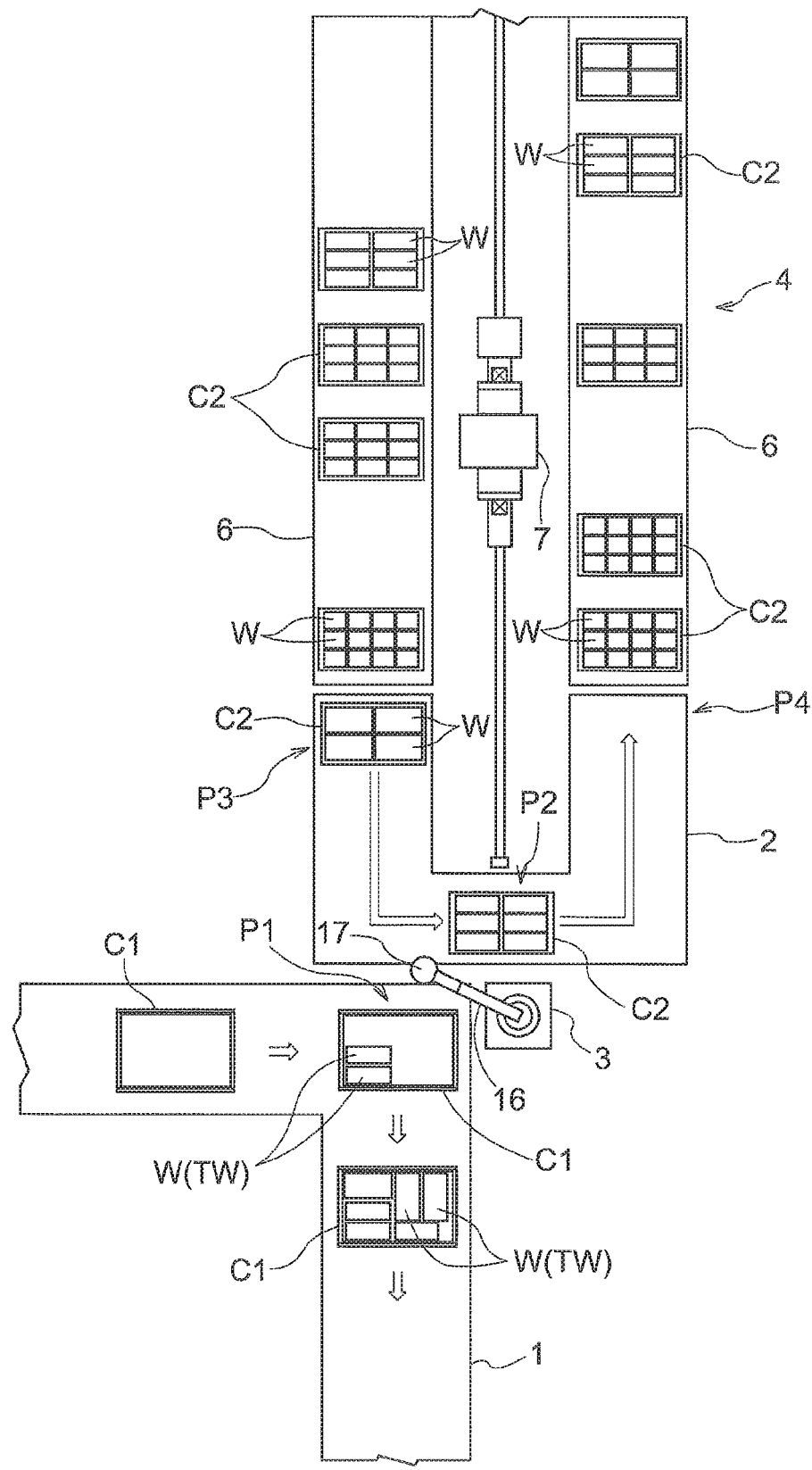
FIG. 1 is a plan view of an article loading facility.

As shown in FIG. 1, the article loading facility includes: a first transport device 1 that transports first containers C1; a second transport device 2 that transports second containers C2; and a transfer device 3 that transfers articles W that are stored in the second containers C2 to the first containers C1, to store the articles W in the first containers C1. The article loading facility also includes an automated warehouse 4 in which the second containers C2 are stored.

Automated Warehouse

As shown in FIG. 1, the automated warehouse 4 includes a storage rack 6 that stores therein the second containers C2, and a stacker crane 7 that transports the second containers C2. The storage rack 6 includes a plurality of storage units that are arranged along the travelling direction of the stacker crane 7 and along the vertical direction. The storage rack 6 is configured to store therein a plurality of second containers C2 such that the plurality of second containers C2 are stored in the storage units.

The automated warehouse 4 transports a second container C2 that is stored in the storage rack 6 to an unloading position P3 using the stacker crane 7, to unload the second container C2 from the automated warehouse 4, and transports a second container C2 at a loading position P4 to the storage rack 6 using the stacker crane 7, to load the second container C2 to the automated warehouse 4.

First Transport Device and Second Transport Device

The first transport device 1 includes a conveyer such as a roller conveyer, and transports the first containers C1 in one direction. A first position P1 is set midway in the transport path of the first transport device 1. The first transport device 1 transports the first containers C1 from a transport source (not shown) to the first position P1, and also transports the first containers C1 from the first position P1 to the transport destination (not shown). No articles W are stored in the first containers C1 that are transported to the first position P1 by the first transport device 1, whereas articles W that have been transported by the transfer device 3 are stored in the first containers C1 that are transported from the first position P1 by the first transport device 1.

The second transport device 2 includes a conveyer such as a roller conveyer, and transports the second containers C2 in one direction. The unloading position P3 is set at the upstream end of the transport path of the second transport device 2, the loading position P4 is set at the downstream end of the transport path of the second transport device 2, and a second position P2 is set midway in the transport path of the second transport device 2. The second transport device 2 transports the second containers C2 from the unloading position P3 to the second position P2, and transports the second containers C2 from the second position P2 to the loading position P4. One or more articles W are stored in the second containers C2 that are transported to the second position P2 by the second transport device 2, and articles W that are stored in one second container C2 are articles W of the same type.

That is, in the article loading facility, a first container C1 that is empty is transported to the first position P1 by the first transport device 1. Also, a second container C2 in which articles W are stored is unloaded from the automated warehouse 4 by the stacker crane 7, and the second container C2 thus unloaded is transported to the second position P2 by the second transport device 2.

The transfer device 3 takes articles W out of a second container C2 that is located at the second position P2, and transfers the articles W thus taken out, from the second container C2 to a first container C1 that is located at the first position P1, so that the articles W are stored in the first container C1. The second container C2, from which all of the articles W that are to be taken out have been taken out, is transported from the second position P2 by the second transport device 2 and is loaded to the automated warehouse 4. The first container C1, in which all of the articles W that are to be stored are stored, is transported from the first position P1 by the first transport device 1. In the following description, an article W that is to be transferred to a first container C1, out of articles W that are stored in a second container C2 that has been transported to the second position P2, is referred to as a target article TW.

Note that the storage rack 6 corresponds to storage units that store therein the second containers C2 (the second supporting members). The stacker crane 7 and the second transport device 2 constitute a transport unit that transports second containers C2 from the storage rack 6 to the second position P2 (the transfer position), and transports second containers C2 from the second position P2 to the storage rack 6.

Containers

Figure 2:
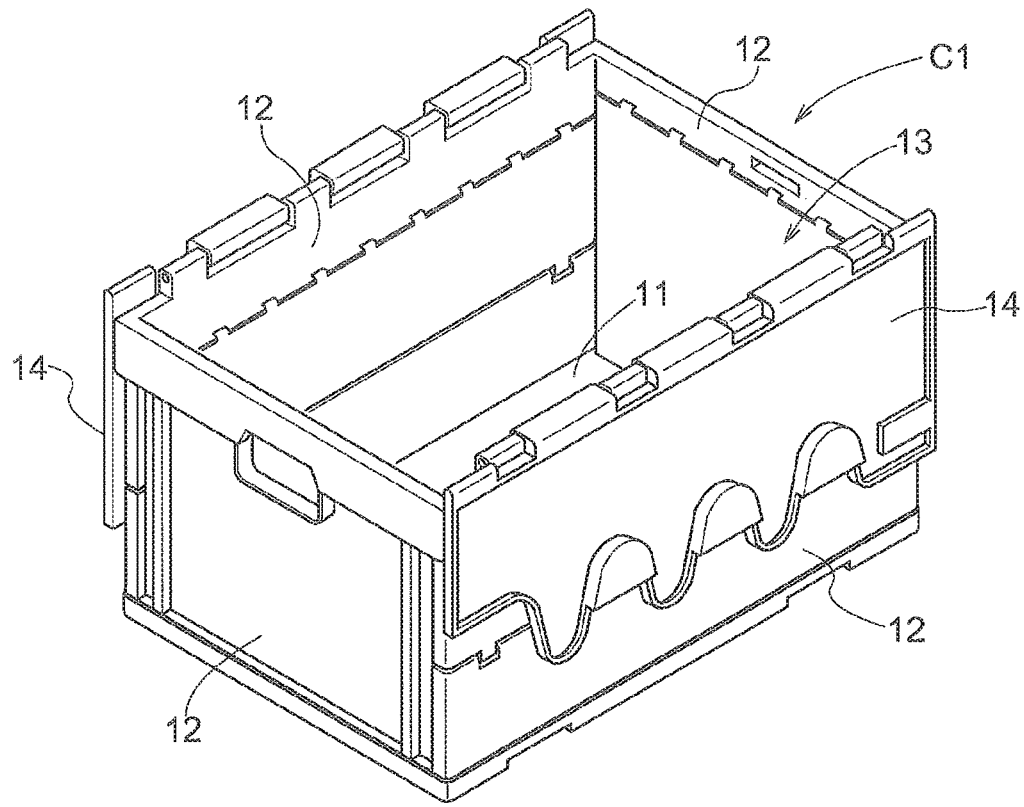
FIG. 2 is a perspective view of a first container.

As shown in FIG. 2, each first container C1 includes a supporting portion 11 that has a rectangular shape and supports articles W from below, and side wall portions 12 that respectively stand upright on four sides that constitute an outer edge of the supporting portion 11. Thus, each first container C1 is formed so as to have a box shape with an open upper face. Each first container C1 also includes a lid member 14 that can be switched to a closed state in which the lid member 14 closes an opening 13 in the upper surface, and an open state in which the lid member 14 opens the opening 13 in the upper surface. Each first container C1 stores therein articles W such that one or more tiers of articles W are stacked in the vertical direction on the supporting portion 11.

As with the first containers C1, each second container C2 includes the supporting portion 11 that has a rectangular shape and supports articles W from below, and the side wall portions 12 that respectively stand upright on four sides that constitute an outer edge of the supporting portion 11. Thus, each second container C2 is formed so as to have a box shape with an open upper face, and stores therein articles W such that the articles W are supported by the supporting member 11 from below.

In the present embodiment, foldable containers made of resin are used as the first containers C1 and the second containers C2. Containers without the lid member 14 may be used as the first containers C1. The capacity of each first container C1 and each second container C2 can be calculated based on the inner dimensions of each container. For example, the capacity of each of the containers with the lid member 14 (the first containers C1) can be calculated by the inside width×the inside length×the height (the length from the upper surface of the supporting portion 11 to the lower surface of the lid member 14 in the closed state), and the capacity of each of the containers without the lid member 14 (the second containers C2) can be calculated by the inside width×the inside length×the height (the length from the upper surface of the supporting portion 11 to the upper ends of the side wall portions 12). In the present embodiment, loading articles W onto the first containers C1 and the second containers C2 is expressed as storing articles W in the first containers C1 and the second containers C2.

A loading area in which articles W are stored is formed in the inner space of each first container C1 and the inner space of each second container C2. Note that first containers C1 with the lid member 14 in the open state correspond to the first supporting member, and the second containers C2 correspond to second supporting members that support target articles TW on a type-by-type basis.

Articles W have a rectangular parallelepiped shape (are formed so as to have a rectangular parallelepiped external shape), and there are various types of articles W. Articles W of the same type have the same length, width, and height. That is, when two articles W are of the same type, these two articles W have the same length, width, and height, whereas when two articles W are of different types, these two articles W may have the same length, width, and height, or be different in one or more or all of length, width, and height.

Articles W of a plurality of types are stored in second containers C2 on a type-by-type basis. That is, one or more articles W of one type are stored in each second container C2. A first container C1 stores therein articles W that have been transferred thereto from one second container C2 or a plurality of second containers C2. Therefore, articles W of one type or articles W of a plurality of types may be stored in a first container C1.

Articles W are stored in the second containers C2 so as to be in an appropriate orientation. More specifically, each article W is stored in the corresponding second container C2 in an orientation (the appropriate orientation) in which support-target surfaces of each article W are parallel with the bottom surface of the container (the upper surface of the supporting portion 11), the support-target surfaces being predetermined two surfaces that are parallel with each other. That is, if an article W in an appropriate orientation is inverted upside down, the article W will still be in an appropriate orientation, and if an article W in an appropriate orientation is rotated about an axis that is orthogonal to the support-target surfaces of the article W, the article W will still be in an appropriate orientation.

The first containers C1 store therein articles W that have been transferred thereto by the transfer device 3, such that the articles W are in an appropriate orientation. The length in the vertical direction of an article W in an appropriate orientation is referred to as "the height", and the length in the lengthwise direction of the article W when viewed in the vertical direction is referred to as "the length", and the length in the lateral direction of the article W when viewed in the vertical direction is referred to as "the width".

Transfer Device

Figure 5:
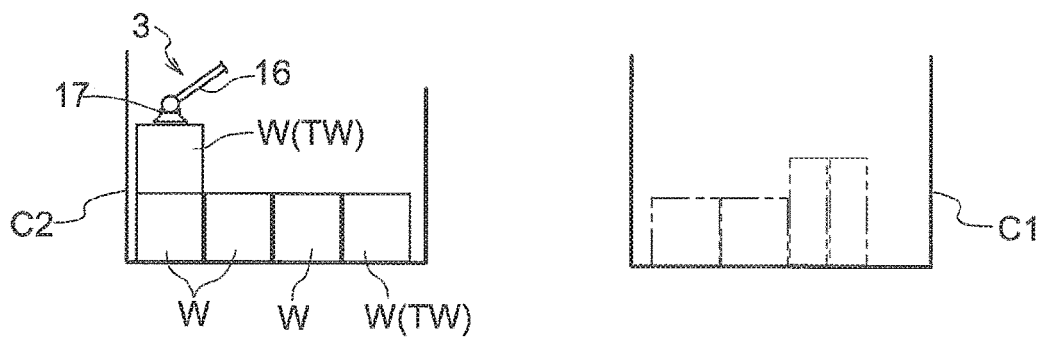
FIG. 5 illustrates operations for first loading control.
Figure 6:
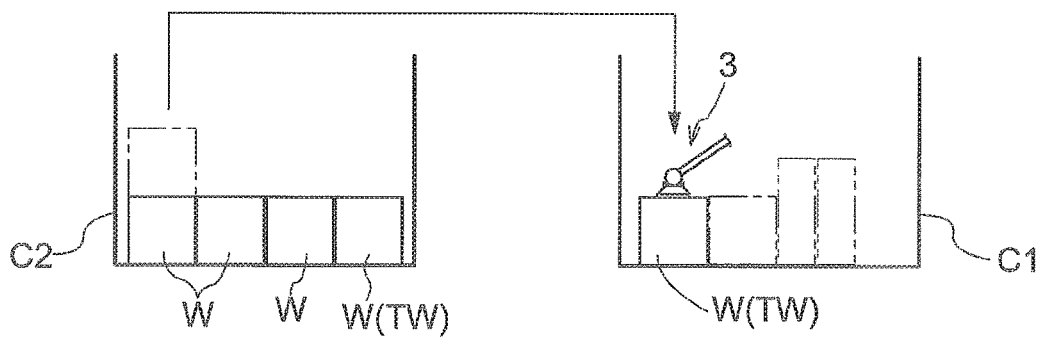
FIG. 6 illustrates operations for the first loading control.
Figure 7:
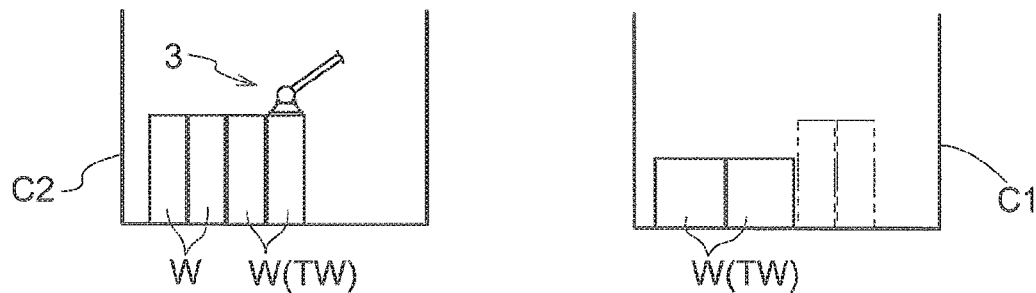
FIG. 7 illustrates operations for the first loading control.
Figure 8:
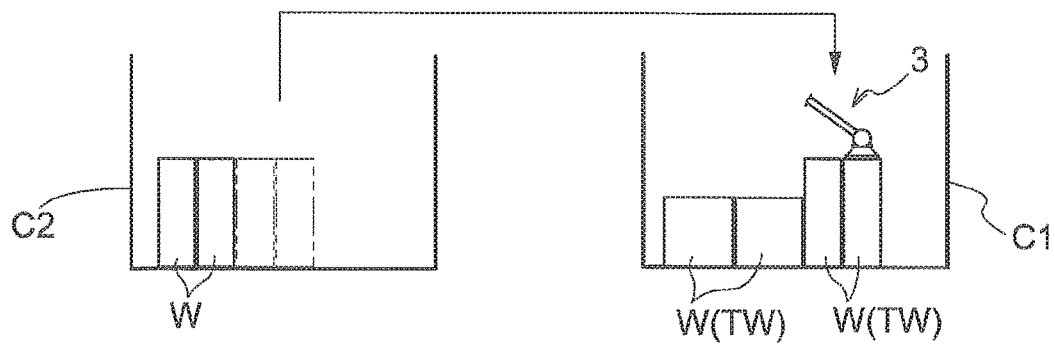
FIG. 8 illustrates operations for the first loading control.

As shown in FIGS. 1 and 5, the transfer device 3 includes an arm 16 that has a plurality of joints, and a suction pad 17 that is supported at the leading end of the arm 16. The transfer device 3 is configured to suck and support an article W using the suction pad 17. As shown in FIGS. 5 to 8, the transfer device 3 takes articles W out of a second container C2 that is located at the second position P2, and transfers the articles W thus taken out, from the second container C2 to a first container C1 that is located at the first position P1, so that the articles W are stored in the first container C1.

The suction pad 17 is configured to be swingable about an axis that extends along the vertical direction, and swingable about an axis that extends along a horizontal direction, relative to the arm 16. The arm 16 is configured to change the orientation of the suction pad 17 to a first orientation in which the suction pad 17 sucks a surface of a target article TW from above, the surface facing upward (see the left part and the right part in FIG. 12), and a second orientation in which the suction pad 17 has swung from the first orientation, about an axis that extends along a horizontal direction (see the middle part in FIG. 12), by bending and stretching the arm 16 at the joints thereof, and swinging the suction pad 17 relative to the arm 16.

Note that the transfer device 3 corresponds to the loading operation unit that performs an operation to load a plurality of target articles TW onto one first container C1 (the first supporting member). The suction pad 17 corresponds to the sucking portion that sucks and supports a surface of a target article TW that is supported by the second container C2 (the second supporting member), and the arm 16 corresponds to the operation portion that moves the suction pad 17 (the sucking portion).

The transfer device 3 is configured to perform a transfer operation to transfer an article W from a second container C2 to a first container C1. In this transfer operation, the upper surface of an article W that is stored in a second container C2 in a given orientation is sucked and supported by the suction pad 17, thereafter the article W thus supported is moved to a position that is immediately above the supporting portion 11 of a first container C1 so as to be in the same orientation as the orientation when the article W was sucked, and then the article W is released from the sucked state. As a result of such a transfer operation, an article W that was stored in a second container C2 in an appropriate orientation can be stored in a first container C1 in an appropriate orientation.

Control Device

Figure 3:
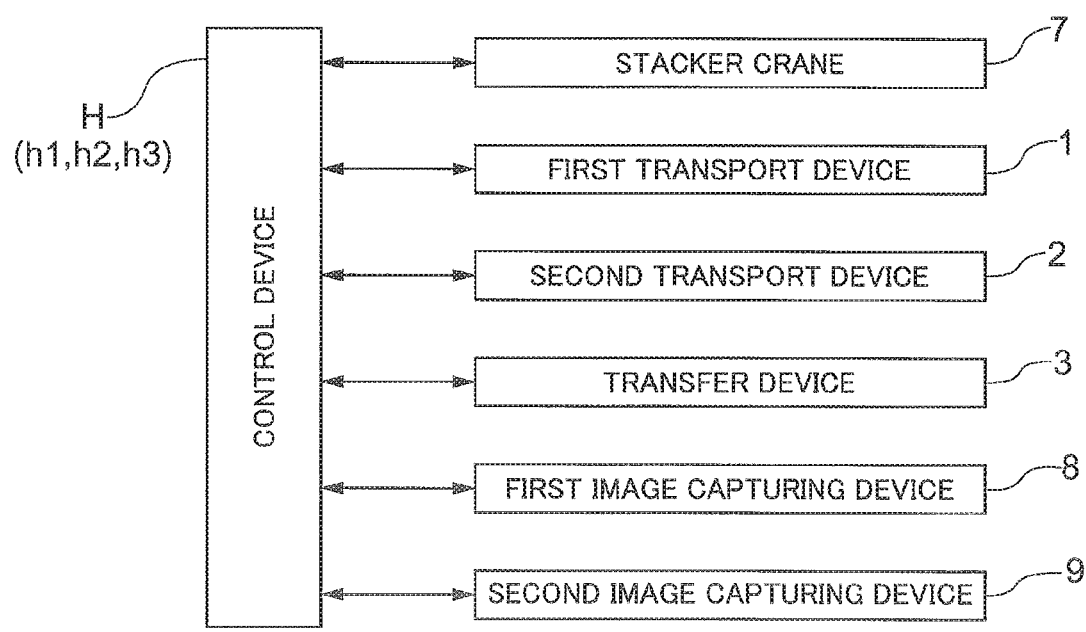
FIG. 3 is a control block diagram.

As shown in FIG. 3, the article loading facility includes a control device H that controls the first transport device 1, the second transport device 2, the transfer device 3, and the stacker crane 7. That is, the control device H has the function of a control unit h1 that controls the transfer device 3. The control device H also has the function of a setting unit h2 that performs an arrangement setting process to set arrangement information for each of one or more target articles TW that are to be stored in a first container C1, the arrangement information indicating the orientation and the position of the corresponding target article TW relative to the first container C1.

Articles W of a plurality of types are respectively assigned product codes that differ according to type. The control device H stores therein sets of a product code and article information in association with each other, the article information indicating the length, width, height, and weight of an article W of the type indicated by the corresponding product code. The control device H also stores therein storage position information of a second container C2 that is stored in the automated warehouse 4, and the product codes of the articles W that are stored in the second container C2, in association with each other.

Order information is transmitted to the control device H from a plurality of shipping destinations. The order information includes code information that indicates product codes that are respectively set for the types of articles W, and number information that indicates, for each of the product codes indicated by the code information, the number of articles W of the type that corresponds to the product code. The pieces of order information are each assigned an order number according to the order in which the pieces of information have been transmitted from shipping destinations.

Image capture information obtained by a first image capturing device 8 and image capture information obtained by a second image capturing device 9 are transmitted to the control device H. The first image capturing device 8 is installed so as to be able to capture an image of a first container C1 that is located at the first position P1, and an article W that is stored in the first container C1. The second image capturing device 9 is installed so as to be able to capture an image of a second container C2 that is located at the second position P2, and an article W that is stored in the second container C2.

The control device H is configured to determine the orientation and the position of an article W that is stored in a first container C1 that is located at the first position P1, based on the image capture information obtained by the first image capturing device 8, to determine whether the article W is in an appropriate state, in which the article W is stored in the first container C1 according to the arrangement indicated by the arrangement information, or in a different state, in which the article W is not stored in the first container C1 according to the arrangement indicated by the arrangement information.

The control device H is configured to determine the orientation and the position of an article W that is stored in a second container C2 that is located at the second position P2, based on the image capture information obtained by the second image capturing device 9, to determine whether the article W stored in the second container C2 is an article W that is in an appropriate orientation, or an article W that is in an inappropriate orientation that is different from the appropriate orientation.

That is, the control device H has the function of a determination unit h3 that determines whether the article W that is supported by the second container C2 is an article W that is in the appropriate orientation or an article W that is in the inappropriate orientation that is not the appropriate orientation, based on the image capture information obtained by the second image capturing device 9. Note that the second image capturing device 9 corresponds to the detection unit that detects the orientation of a target article TW that is supported by the second container C2 (the second supporting member) relative to the second container C2.

The control device H is configured to determine whether an article W that is stored in a second container C2 is in a supportable orientation, in which a first support-target surface of the article W in the second container C2 can be sucked and supported by the suction pad 17 from above, or an unsupportable orientation, in which the first support-target surface of the article W in the second container C2 cannot be sucked or supported by the suction pad 17 from above, based on the image capture information obtained by the second image capturing device 9. Note that the control device H determines that the orientation of an article W is a supportable orientation if the inclination of the first support-target surface relative to the supporting portion 11 of the second container C2 is smaller than a preset angle (45° in the present embodiment), and that the orientation of the article W is an unsupportable orientation if the inclination of the first support-target surface relative to the supporting portion 11 of the second container C2 is larger than or equal to the preset angle.

Figure 4:
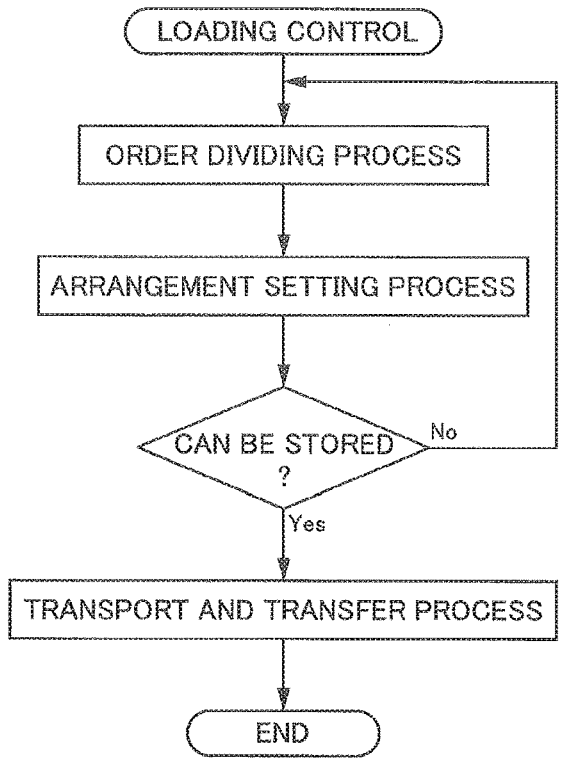
FIG. 4 is a flowchart for loading control.

As shown in FIG. 4, the control device H performs an order dividing process, an arrangement setting process, and a transport and transfer process (the loading process) in this order. The order dividing process is a process for setting the number of first containers C1 onto which load-target articles W indicated by the arrangement order information are to be loaded. The arrangement setting process is a process for setting, for each of one or more target articles TW that are to be stored in one first container C1, the arrangement information that indicates the orientation and the position of the corresponding target article TW relative to the first container C1. The transport and transfer process (the loading process) is a process for controlling the first transport device 1, the second transport device 2, and the transfer device 3 based on the arrangement information so that one or more target articles TW is stored in a first container C1 according to the orientations and the positions indicated by the arrangement information. Note that an article W that is indicated by the arrangement order information is referred to as a load-target article W, and an article W that is to be stored in one first container C1 is referred to as a target article TW. In the case where all of the articles W indicated by the arrangement order information are to be stored in one first container C1, the load-target articles W are the same as the target articles TW.

The following are additional descriptions of the order dividing process, the arrangement setting process, and the transport and transfer process (the loading process).

Order Dividing Process

The order dividing process is a process for setting the number of first containers C1 in which load-target articles W indicated by the arrangement order information are to be stored.

Specifically, the load-target articles W are stored such that the total volume of the articles W that are to be stored in one first container C1 will be smaller than or equal to a preset volume of the first container C1 in which articles W are to be stored, based on the volume of each load-target article W and the number of load-target articles W indicated by the arrangement order information. In the present embodiment, the preset volume is 60% of the capacity of each first container C1. If the total volume of the load-target articles W indicated by the arrangement order information is smaller than or equal to 60% of the capacity of each first container C1, it is determined that the load-target articles W can be stored in one first container C1, and one is set as the number of first containers C1. If the total volume of the load-target articles W indicated by the arrangement order information is greater than 60% of the capacity of each first container C1, two or more is set as the number of first containers C1 so that the total volume of articles W that are to be stored in one first container C1 will be smaller than or equal to 60% of the capacity.

Arrangement Setting Process

In the arrangement setting process, the arrangement information is set in advance to indicate an arrangement that, after all target articles TW of a first type are stored in first containers C1, allows all target articles TW of a second type, which is different from the first type, to be stored in first containers C1, and an arrangement order setting process is performed to set a type arrangement order that indicates, when target articles TW of a plurality of types are to be stored in first containers C1 according to the arrangement information, the order in which the plurality of types are to be arranged. Note that setting the arrangement information in advance means setting the arrangement information before performing an operation to store target articles TW in first containers C1, i.e. setting the arrangement information before performing the transport and transfer process (the loading process).

In the arrangement setting process, the control device H also sets an arrangement in which target articles TW are stacked in one or more tiers in the vertical direction, and sets an arrangement in which target articles TW of the same type are preferentially arranged in the same tier if an arrangement in which target articles TW are stacked in a plurality of tiers has been set.

Specifically, in the arrangement setting process, an arrangement is set to load articles W (target articles TW), which are to be stored in one first container C1, to one or more tiers in the first container C1. That is, for example, if there are articles W with a product code A and articles W with a product code B as target articles TW, the order of A and B is set as the type arrangement order, for example. Then, an arrangement is set so as to allow all of the articles W with the product code B to be stored in the first container C1 after all of the articles W with the product code A, which comes first, have been stored in the first container C1.

In the arrangement setting process, a plurality of arrangement patterns are created by changing the type arrangement order and the positions and orientations of articles W until a preset time has elapsed after the order dividing process has been completed. The arrangement patterns are created in this arrangement setting process by determining an arrangement from the lowest tier, and determining arrangements for all of the target articles TW.

In the arrangement setting process, an arrangement pattern in which the area of a portion that supports target articles TW, out of a supporting surface (a surface for supporting target articles TW, of the first container C1 (a surface that faces upward, of the supporting portion 11)), is the largest is preferentially selected from among the plurality of arrangement patterns that have been created as described above. If the area of the portion that supports target articles TW is the same in several arrangement patterns, an arrangement pattern that leads to the smallest height of target articles TW when target articles TW are stacked according to the arrangement pattern is preferentially selected, for example. Thus, one arrangement pattern is selected. In this way, in the arrangement setting process, an arrangement (an arrangement pattern) is set to load articles W (target articles TW), which are to be stored in one first container C1, to one or more tiers in the first container C1.

In the arrangement setting process, depending on the combination of the types and number of articles W, there are cases where the height of target articles TW is larger than the height of each first container C1 in all of the plurality of arrangement patterns that have been created as described above when the target articles TW are stacked according to the corresponding arrangement pattern. In such cases, the control device H determines that it is impossible to store articles W, and performs the order dividing process again. If the order dividing process is performed again, it is conceivable that the preset volume in the previous order dividing process (60%, for example) will be lowered (to 50%, for example).

Transport and Transfer Process

In the transport and transfer process, the first transport control, the second transport control, and the transfer control are performed, and as a result, all of the target articles TW are transferred from one or more second containers C2 to one first container C1, and the target articles TW are stored in the first container C1 according to an arrangement indicated by the arrangement information.

The second transport control is control that is performed to control the second transport device 2 and the stacker crane 7 to transport a second container C2 from the storage rack 6 to the second position P2, and, after all of the target articles TW stored in the second container C2 have been taken out by the transfer device 3 at the second position P2, transport the second container C2 from the second position P2 to the storage rack 6. Also, in the second transport control, second containers C2 are transported to the second position P2 such that the articles W of a plurality of types stored in the second containers C2 that are to be transported to the second position P2 will be arranged in the order indicated by the type arrangement order.

The first transport control is control that is performed in parallel with the second transport control, to control the first transport device 1 to transport an empty first container C1 from the outside to the first position P1, and, after all of the target articles TW have been transferred to the first container C1 at the first position P1 by the transfer device 3, transport the first container C1 from the first position P1 to the outside.

The transfer control is control that is performed to control the transfer device 3 to take out target articles TW that are stored in a second container C2 at the second position P2, and store the articles TW in a first container C1 at the first position P1 according to an arrangement indicated by the arrangement information.

In this way, it is possible to transport a plurality of articles W all at once to the second position P2 by transporting a second container C2 in which the articles W are stored to the second position P2, and it is unnecessary to transport a second container C2 in which target articles TW of the same type are stored to the second position P2 a plurality of times. Therefore, it is possible to reduce the time required to load a plurality of target articles TW into a first container C1.

Transfer Control

Transfer control will be described next.

In the description of transfer control, a flat face that faces downward of a target article TW that is in an orientation indicated by the arrangement information is defined as a support-target surface, and a surface that faces upward of a target article TW that is in an orientation indicated by the arrangement information is defined as a first sucking-target surface. In other words, a surface that faces downward of a target article TW that is in the appropriate orientation is the support-target surface, and a surface that faces upward of a target article TW that is in the appropriate orientation is the first sucking-target surface. Incidentally, if a target article TW has a box shape, for example, there are cases where the target article TW bulges due to changes in the temperature or the atmospheric pressure, or due to the target article TW being overstuffed, for example. Such the surface of a bulging target article TW that faces downward when the target article TW is in the orientation indicated by the arrangement information is bulging compared to a flat surface. However, even if the target article TW is bulging and the surface of the bulging target article TW that faces downward when the target article TW is in the orientation indicated by the arrangement information is not flat when the target article TW is transferred, the surface of the target article TW that faces downward when the target article TW is in the orientation indicated by the arrangement information is assumed as being "a flat surface" if the surface of the target article TW that faces downward when the target article TW is in the orientation indicated by the arrangement information is flat under predetermined conditions (predetermined conditions regarding the temperature and the atmospheric pressure, conditions under which the target article TW is staffed with a predetermined amount of goods).

The surface of the article W that faces upward when the article W is not in the appropriate orientation is defined as a second sucking-target surface. That is, if the orientation of the article W that is not in the appropriate orientation is an unsupportable orientation (the inclination of the first sucking-target surface is larger than or equal to the preset angle (45° in the present embodiment)), one surface out of four surfaces other than two surfaces that are the support-target surface and the first sucking-target surface is the second sucking-target surface out of the six surfaces of the article W. Specifically, if an article W is rotated from the appropriate orientation by 90°, one surface out of four surfaces other than two surfaces that are the support-target surface and the first sucking-target surface is the second sucking-target surface out of the six surfaces of the article W. If the orientation of an article W that is not in the appropriate orientation is a supportable orientation (the inclination of the first sucking-target surface is smaller than the preset angle), the surface that is the first sucking-target surface when it is assumed that the article W is in the appropriate orientation is the second sucking-target surface out of the six surfaces of the article W. Specifically, if an article W is rotated from the appropriate orientation by 30°, for example, the surface that is the first sucking-target surface when it is assumed that the article W is in the appropriate orientation is the second sucking-target surface out of the six surfaces of the article W.

In the transfer control, first loading control and second loading control are performed. The first loading control is performed when a target article TW that has been determined as being an article W that is in the appropriate orientation is to be stored in a first container C1 in the appropriate orientation, and the second loading control is performed when a target article TW that has been determined as being an article W that is in the inappropriate orientation is to be loaded onto a first container C1 in the appropriate orientation.

As shown in FIGS. 5 to 8, 10, and 11, the first loading control is performed to control the transfer device 3 to suck and support the first sucking-target surface of a target article TW that is stored in the second container C2 from above, move the suction pad 17, and thereafter release the target article TW from the state of being sucked by the suction pad 17 when the target article TW is located immediately above the first container C1 and the first sucking-target surface faces upward.

More specifically, when a target article TW is in the appropriate orientation, the surface of the target article TW that faces upward is the first sucking-target surface. The first loading control is performed to control the transfer device 3 to suck and support the first sucking-target surface of a target article TW that is stored in a second container C2 from above, then move the suction pad 17 to move the target article TW to a position that is immediately above the supporting portion 11 of the first container C1 so that the target article TW is moved to a position indicated by the arrangement information, and thereafter release the target article TW from the state of being sucked by the suction pad 17 when the first sucking-target surface faces upward.

In this way, by performing the first loading control, it is possible to store a target article TW that is stored in a second container C2 in the appropriate orientation, in a first container C1, in the appropriate orientation according to the arrangement information.

Figure 12:
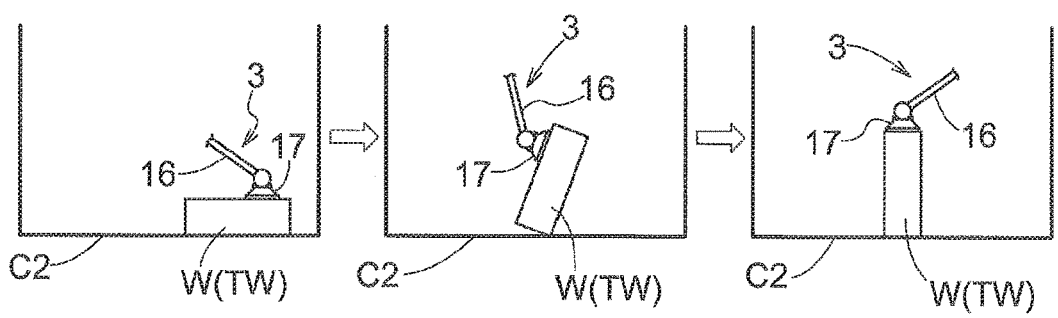
FIG. 12 illustrates operations for second loading control.
Figure 13:
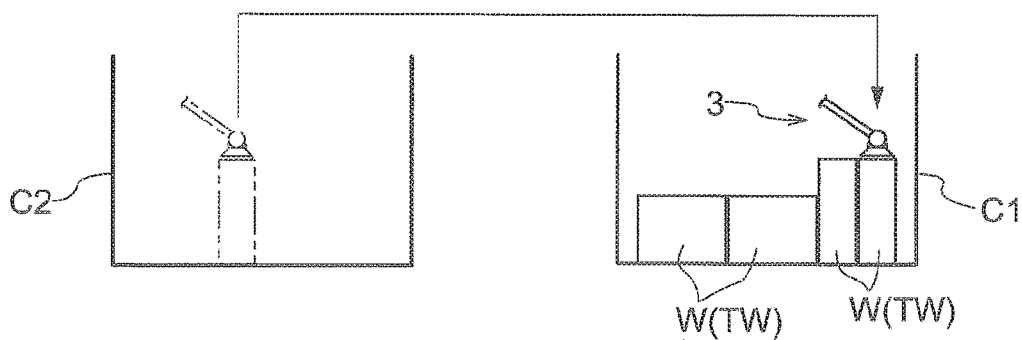
FIG. 13 illustrates operations for the second loading control.

As shown in FIGS. 12 and 13, the second loading control is performed to control the transfer device 3 to suck and support the second sucking-target surface, which faces upward, of a target article TW that is stored in a second container C2, then move the suction pad 17 so that the suction pad 17 performs an orientation changing operation to change the orientation of the target article TW from the inappropriate orientation to the appropriate orientation and change the surface that is to be sucked by the suction pad 17 from the second sucking-target surface to the first sucking-target surface, and thereafter release the target article TW from the state of being sucked by the suction pad 17 when the target article TW is located immediately above the first container C1 and the first sucking-target surface faces upward.

More specifically, when a target article TW is in the inappropriate orientation, the surface of the target article TW that faces upward is the second sucking-target surface. In the second loading control, the orientation changing operation is performed first to change the orientation of a target article TW that is stored in a second container C2 to the appropriate orientation, and then suck and support the second sucking-target surface of the target article TW from above.

Specifically, if the second sucking-target surface is parallel with the upper surface of the supporting portion 11 of the second container C2 (the orientation of the target article TW has been rotated from the appropriate orientation by 90° and the orientation of the target article TW is an unsupportable orientation), the orientation changing operation is an operation that is performed to change the orientation of the suction pad 17 from the first orientation, in which the suction pad 17 sucks the second sucking-target surface of the target article TW from above, to the second orientation, then release the target article TW from the state of being sucked by the suction pad 17 to change the orientation of the target article TW to the appropriate orientation while keeping the orientation of the suction pad 17 in the second orientation, and thereafter suck the first sucking-target surface of the target article TW that faces upward, using the suction pad 17 in the first orientation.

If the second sucking-target surface is the same as the first sucking-target surface despite the second sucking-target surface being inclined relative to the upper surface of the supporting portion 11 of the second container C2 (the orientation of the target article TW is a supportable orientation), the orientation changing operation is an operation that is performed to change the orientation of the suction pad 17 from the second orientation, in which the suction pad 17 sucks the second sucking-target surface of the target article TW from above, to the first operation, to change the orientation of the target article TW to the appropriate orientation, and suck the first sucking-target surface of the target article TW that faces upward from above, using the suction pad 17 that is in the first orientation.

Then, in the second loading control, after the orientation changing operation has been performed, the same operation as the first loading control is performed to move the suction pad 17 to move the target article TW to a position that is immediately above the supporting portion 11 of the first container C1 so that the target article TW is moved to a position indicated by the arrangement information, and thereafter release the target article TW from the state of being sucked by the suction pad 17 when the first sucking-target surface faces upward.

In this way, by performing the second loading control, it is possible to store a target article TW that is stored in a second container C2 in the inappropriate orientation, in a first container C1, in the appropriate orientation according to the arrangement information.

Figure 9:
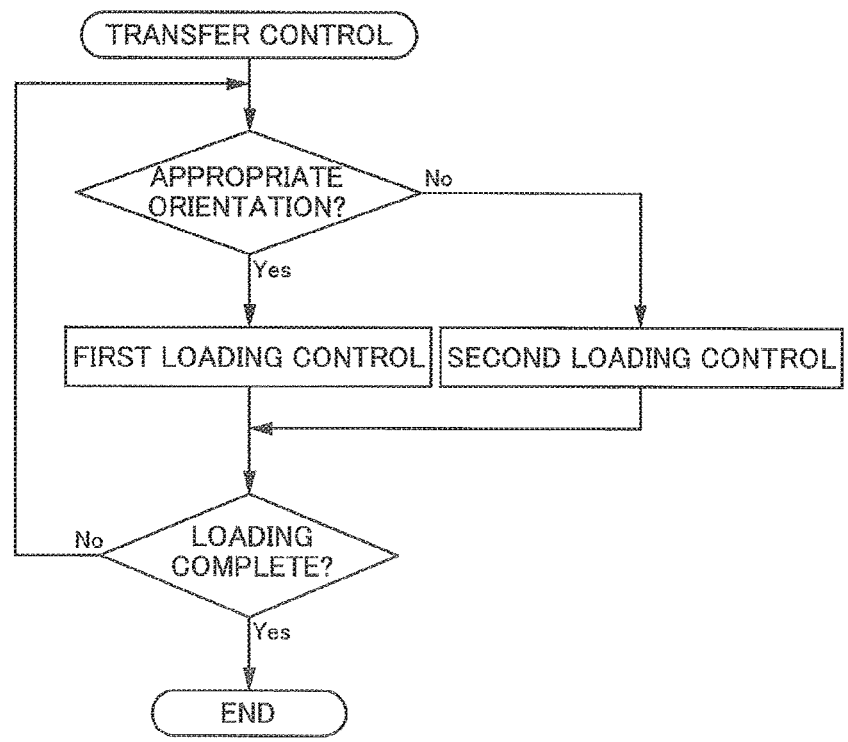
FIG. 9 is a flowchart for transfer control.
Figure 10:
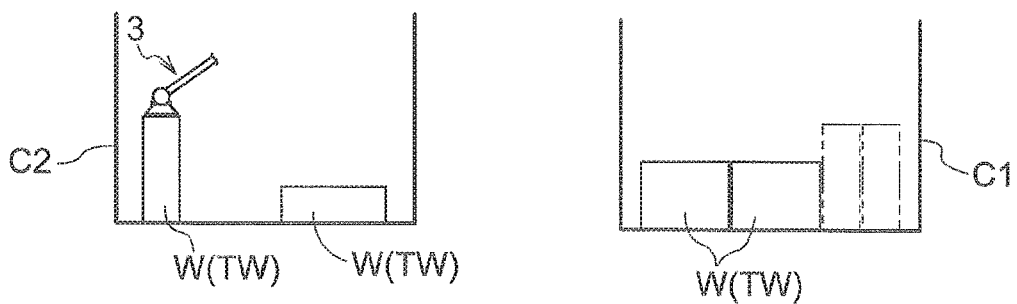
FIG. 10 illustrates operations for the first loading control.
Figure 11:
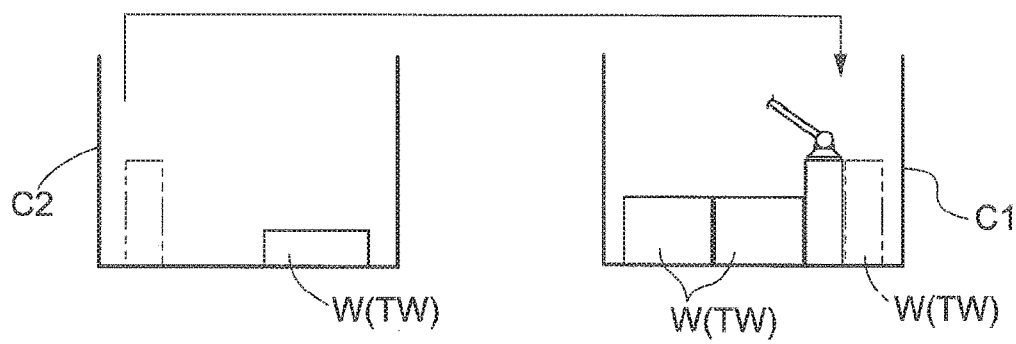
FIG. 11 illustrates operations for the first loading control.

The following describes the transfer control with reference to the flowchart shown in FIG. 9.

In the transfer control, the control device H first captures an image of a second container C2 that is located at the second position P2, using the second image capturing device 9, and determines the position and the orientation of each of one or more articles W stored in the second container C2, based on the image capture information, and also determines whether each of the article W stored in the second container C2 is an article W that is in the appropriate orientation or an article W that is in the inappropriate orientation. Then, the control device H selects one of the articles W stored in the second container C2, as a target article TW. Here, if the articles W stored in the second container C2 include an article W in the appropriate orientation and an article W in the inappropriate orientation, the control device H preferentially selects the article W in the appropriate orientation as the target article TW.

If the target article TW thus selected is an article W in the appropriate orientation, the control device H performs the first loading control to store the target article TW in the first container C1 according to the arrangement information. If the target article TW thus selected is an article W in the inappropriate orientation, the control device H performs the second loading control to store the target article TW in the first container C1 according to the arrangement information. The loading control, which is the first loading control and the second loading control, is repeatedly performed, and when all of the target articles TW that are to be stored in one first container C1 have been stored in the first container C1, the loading control for the one first container C1 ends, and thus loading completes.

In this way, if a target article TW that is to be taken out of a second container C2 is an article W that is in the appropriate orientation, the control device H performs the first loading control to load the target article TW, which is on the second container C2 in the appropriate orientation, onto the first container C1 while keeping the appropriate orientation, and thus it is possible to load the target article TW onto the first container C1 according to the arrangement information. If a target article TW that is to be taken out of a second container C2 is an article W that is in the inappropriate orientation, the control device H performs the second loading control to load the target article TW onto the first container C1 after changing the orientation of the target article TW on the second container C2 from the inappropriate orientation to the appropriate orientation, and thus it is possible to load the target article TW onto the first container C1 according to the arrangement information.

OTHER EMBODIMENTS (1) In the above-described embodiment, if a target article that is stored in a second container is an article that is in the inappropriate orientation, the inappropriate orientation of the target article in the second container is changed to the appropriate orientation before the target article in the inappropriate orientation is taken out of the second container. However, the inappropriate orientation of the target article in the second container may be changed to the appropriate orientation outside the second container after the target article in the inappropriate orientation has been taken out of the second container.

Figure 14:
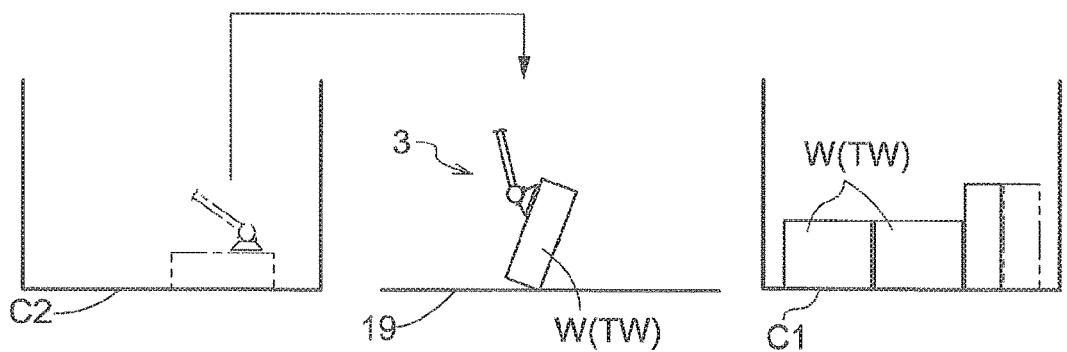
FIG. 14 illustrates operations for the second loading control according to another embodiment (1).
Figure 15:
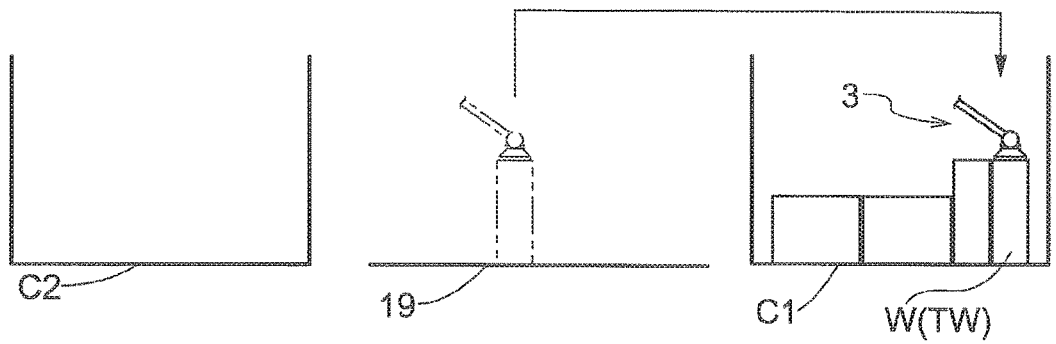
FIG. 15 illustrates operations for the second loading control according to the other embodiment (1).

Specifically, as shown in FIGS. 14 and 15, for example, a supporting platform 19, on which a target article TW is loaded when the orientation of the target article TW is changed from the inappropriate orientation to the appropriate orientation, is provided. In the second loading control, the orientation changing operation is performed first to support the second sucking-target surface, which faces upward, of the target article TW in the second container C2 to move the target article TW onto the supporting platform 19, then change the orientation of the target article TW on the supporting platform 19 to the appropriate orientation, and thereafter suck and support the first sucking-target surface of the target article TW from above. More specifically, the orientation changing operation is performed to first move the suction pad 17, which is in the first orientation and sucks the second sucking-target surface of the target article TW from above, to move the target article TW to a position that is immediately above supporting platform 19, and change the orientation of the suction pad 17 from the first orientation to the second orientation midway through the movement or upon the completion of the movement. Next, the target article TW is released from the state of being sucked by the suction pad 17 while keeping the suction pad 17 in the second orientation, and thereafter the suction pad 17 in the first orientation sucks the first sucking-target surface of the target article TW that faces upward. Then, in the second loading control, after the orientation changing operation has been performed, the same operation as the first loading control is performed to move the suction pad 17 to move the target article TW to a position that is immediately above the supporting portion 11 of the first container C1 so that the target article TW is moved to a position indicated by the arrangement information, and thereafter release the target article TW from the state of being sucked by the suction pad 17 when the first sucking-target surface faces upward.

(2) In the above-described embodiment, if a target article that is stored in a second container is an article that is in the inappropriate orientation, the orientation of the target article is changed to the appropriate orientation, and thereafter the target article in the appropriate orientation is stored in the first container. However, if it is possible to store the target article in the inappropriate orientation in the first container while keeping the orientation, the target article that is in an orientation other than the appropriate orientation may be stored in the first container.

More specifically, the control unit of the control device performs, in addition to the first loading control and the second loading control, a third loading control that is to be performed when a target article that has been determined as an article in the inappropriate orientation by the determination unit of the control device is to be loaded onto the first container while keeping the inappropriate orientation. The third loading control is performed to control the loading operation unit to suck and support the second sucking-target surface, which faces upward, of a target article that is supported by a second container, then move the sucking portion, and thereafter release the target article from the state of being sucked by the sucking portion when the target article is located immediately above the first container and the second sucking-target surface faces upward.

The determination unit of the control device performs a determination process to determine whether or not a target article that has been determined as being an article that is in the inappropriate orientation can be loaded onto the first container in the inappropriate orientation, based on detection information obtained by the second image capturing device and information regarding a loading area of the first container onto which an article can be loaded.

Then, if the determination unit has performed the determination process and has determined that the article cannot be loaded onto the first container, the control unit of the control device performs the second loading control to control the loading operation unit to load the target article onto the first container according to the orientation and the position indicated by the arrangement information. If the determination unit has performed the determination process and has determined that the article can be loaded onto the first container, the control unit of the control device performs the third loading control instead of the second loading control to control the loading operation unit to load the target article onto the first container according to an orientation and a position that are different from those indicated by the arrangement information.

In the determination process, the determination unit compares the total volume of the plurality of target articles indicated by the arrangement information with the volume of the loading area (the storage capacity volume) of the first container onto which articles can be loaded, based on the arrangement information and the volume of the loading area of the first container onto which articles are to be loaded, and the determination unit determines that the target articles that have been determined as being articles that are in the inappropriate orientation can be loaded onto the first container in the inappropriate orientation if the total volume of the plurality of target articles is sufficiently smaller than the volume of the loading area.

Alternatively, the determination unit may determine that the target articles that have been determined as being articles that are in the inappropriate orientation can be loaded onto the first container in the inappropriate orientation if it has been determined that there is a space on the first container onto which articles in the inappropriate orientation can be loaded, based on the shape of each article in the inappropriate orientation indicated by the arrangement information, and the loading area of the first container onto which articles can be loaded, immediately before the articles in the inappropriate orientation are loaded.

Figure 16:
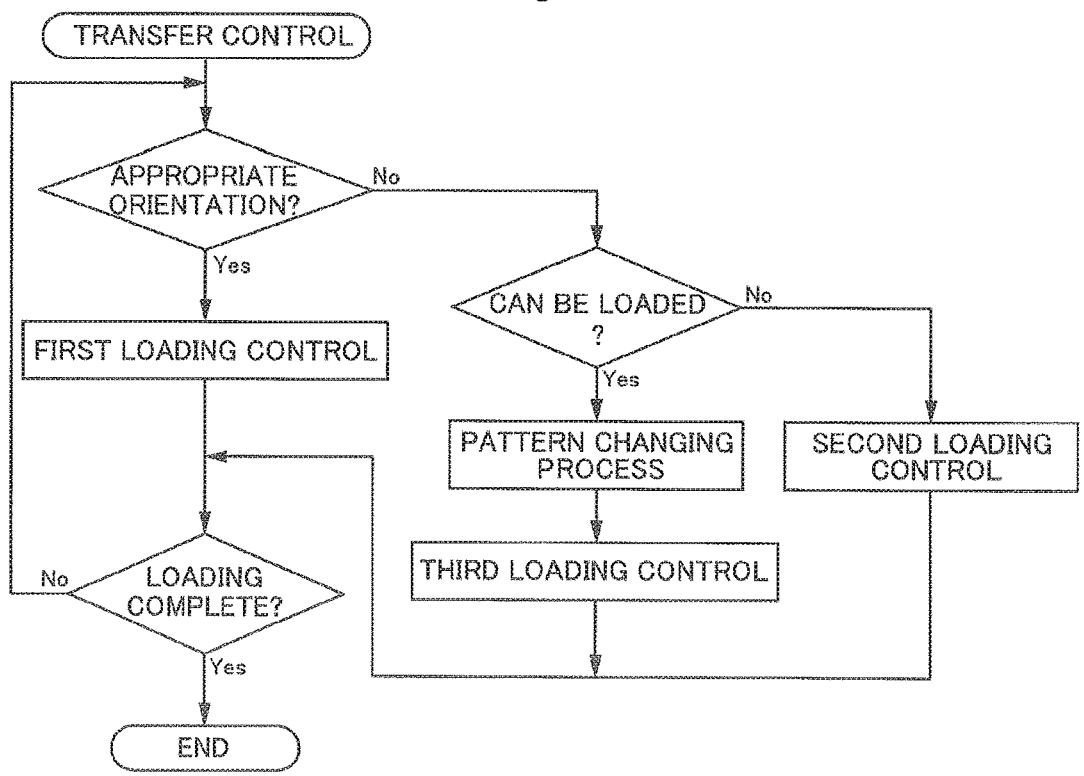
FIG. 16 is a flowchart for transfer control according to another embodiment (2).

The following describes the transfer control with reference to the flowchart shown in FIG. 16.

The control device H first determines the position and the orientation of each of one or more articles W stored in the second container C2, based on the image capture information obtained by the second image capturing device 9, and also determines whether each of the article W stored in the second container C2 is an article W that is in the appropriate orientation or an article W that is in the inappropriate orientation. Then, the control device H selects one of the articles W stored in the second container C2, as a target article TW.

If the target article TW thus selected is an article W in the appropriate orientation, the control device H performs the first loading control to store the target article TW in the first container C1 according to the arrangement information. If the target article TW thus selected is an article W that is in the inappropriate orientation, and it has been determined in the determination process that the target article TW cannot be loaded, the control device H performs the second loading control to store the target article TW in the first container C1 according to the arrangement information after changing the orientation of the target article TW to the appropriate orientation. If the target article TW thus selected is an article W that is in the inappropriate orientation, and it has been determined in the determination process that the target article TW can be loaded, the control device H creates an arrangement pattern for loading the article W that is in the inappropriate orientation and other articles W that are in the appropriate orientation with reference to the orientation and the position of the target article TW that is stored in the current first container C1, based on the image capture information obtained by the second image capturing device 9, changes the arrangement pattern to the newly created arrangement pattern, and performs the third loading control to store the target articles TW that are in the appropriate orientation (the target articles TW that was in the inappropriate orientation, but are in the appropriate orientation due to the arrangement pattern having been changed) in the first container C1 according to the new arrangement information.

(3) In the above-described embodiment, the arrangement information indicates an arrangement in which articles are stacked in one or more tiers. However, the arrangement information may indicate an arrangement in which articles are stacked in only one tier.

(4) In the above-described embodiment, the external shape of each article is a rectangular parallelepiped shape. However, the external shape may be a shape other than a rectangular parallelepiped shape, such as a hemisphere shape or a triangular pyramid shape, and it is only necessary that each article has a flat surface that faces downward when the article is in the appropriate orientation.

(5) In the above-described embodiment, containers that have a box shape with an open upper face are used as the first supporting member and the second supporting member. However, a member that has a plate-like shape such as a palette-like shape, or a transport conveyor or the like that has a transport function may be used as one or both of the first supporting member and the second supporting member, and the first supporting member and the second supporting member need only have a supporting surface onto which articles can be loaded.

SUMMARY OF ABOVE-DESCRIBED EMBODIMENTS

The following is a summary of the above-described article loading facility.

The article loading facility includes: a loading operation unit that loads a plurality of target articles onto one first supporting member; and a control unit that controls the loading operation unit, wherein the control unit controls the loading operation unit so that the plurality of target articles are loaded onto the first supporting member according to arrangement information that indicates the orientation and the position of each of the plurality of target articles relative to the first supporting member, a surface of a target article that faces downward when the target article is in the orientation indicated by the arrangement information is defined as a support-target surface, a surface of a target article that faces upward when the target article is in the orientation indicated by the arrangement information is defined as a first sucking-target surface, and an article that is in an orientation in which the support-target surface faces downward is defined as an article that is in an appropriate orientation, the loading operation unit includes: a sucking portion that sucks and supports a surface of a target article that is supported by a second supporting member; and an operation portion that moves the sucking portion, the article loading facility further comprises: a detection unit that detects the orientation of a target article that is supported by the second supporting member; and a determination unit that determines whether an article that is supported by the second supporting member is an article that is in the appropriate orientation or an article that is in an inappropriate orientation that is not the appropriate orientation, based on detection information obtained by the detection unit, the control unit performs first loading control that is to be performed when a target article that has been determined by the determination unit as being an article that is in the appropriate orientation is to be loaded onto the first supporting member in the appropriate orientation, and second loading control that is to be performed when a target article that has been determined by the determination unit as being an article that is in the inappropriate orientation is to be loaded onto the first supporting member in the appropriate orientation, the first loading control is performed to control the loading operation unit to suck and support the first sucking-target surface of a target article that is supported by the second supporting member, from above, then move the sucking portion, and thereafter release the target article from the state of being sucked by the sucking portion when the target article is located immediately above the first supporting member and the first sucking-target surface faces upward, and the second loading control is performed to control the loading operation unit to suck and support a second sucking-target surface, which faces upward, of a target article that is supported by the second supporting member, from above, then move the sucking portion so that the sucking portion performs an orientation changing operation to change the orientation of the target article from the inappropriate orientation to the appropriate orientation and change a surface that is to be sucked by the sucking portion from the second sucking-target surface to the first sucking-target surface, and thereafter release the target article from the state of being sucked by the sucking portion when the target article is located immediately above the first supporting member and the first sucking-target surface faces upward.

With this configuration, if a target article is on the second supporting member in the appropriate orientation, a surface of the target article that is supported by the second supporting member, the surface facing upward, is the first sucking-target surface. Also, since the target article is loaded onto the first supporting member in the appropriate orientation, a surface of the target article on the first supporting member, the surface facing upward, is the first sucking-target surface.

Therefore, when a target article that is to be taken out of the second supporting member is supported by the second supporting member in the appropriate orientation, the control unit performs the first loading control to suck the first sucking-target surface, which faces upward, of the target article that is supported by the second supporting member, from above, then take the target article out of the second supporting member, and load the target article onto the first supporting member while keeping the appropriate orientation, and thus the target article can be loaded onto the first supporting member according to the arrangement information.

If a target article that is to be taken out of the second supporting member is supported by the second supporting member in the inappropriate orientation, if the target article that is supported by the second supporting member in the inappropriate orientation is taken out and the target article thus taken out is loaded onto the first supporting member while keeping the inappropriate orientation, the target article is loaded onto the first supporting member in an orientation that is different from the orientation that is indicated by the arrangement information. Therefore, if the target article that is to be taken out of the second supporting member is an article that is in the inappropriate orientation, the control unit performs the second loading control. In the second loading control, the orientation changing operation is performed first to suck the second sucking-target surface, which faces upward, of the target article that is supported by the second supporting member in the inappropriate orientation, change the orientation of the target article from the inappropriate orientation to the appropriate orientation, and change the surface that is to be sucked by the sucking portion from the second sucking-target surface to the first sucking-target surface. Next, the target article of which the orientation has been changed to the appropriate orientation is loaded onto the first supporting member. Thus, the target article can be loaded onto the first supporting member according to the arrangement information.

In this way, in the case where a target article that is supported by the second supporting member is in the inappropriate orientation as well as the case where a target article that is supported by the second supporting member is in the appropriate orientation, the target article that is supported by the second supporting member can be loaded onto the first supporting member according to the arrangement information. Therefore, it is possible to smoothly load target articles onto the first supporting member according to the arrangement information even if the orientation of a target article that is supported by the second supporting member is different from the appropriate orientation.

Here, it is preferable that an external shape of each article is rectangular parallelepiped shape, the operation unit is configured to change the orientation of the sucking portion to a first orientation in which the sucking portion sucks a surface of a target article that faces upward from above, and a second orientation in which the sucking portion has swung from the first orientation, about an axis that extends along a horizontal direction, and the orientation changing operation is an operation that is performed to change the orientation of the sucking portion from the first orientation, in which the sucking portion sucks the second sucking-target surface of a target article from above, to the second orientation, then release the target article from the state of being sucked by the sucking portion to change the orientation of the target article to the appropriate orientation while keeping the orientation of the sucking portion in the second orientation, and thereafter suck the first sucking-target surface of the target article that faces upward, using the sucking portion in the first orientation.

With this configuration, the orientation changing operation is performed to suck the second sucking-target surface, which faces upward, of the second supporting member that is on the second supporting member in the inappropriate orientation, and change the surface to be sucked by the sucking portion to the first sucking-target surface by changing the orientation of the target article from the inappropriate orientation to the appropriate orientation before taking the target article out of the second supporting member such that the target article does not overlap the second supporting member when viewed in the vertical direction. Therefore, there is no need to secure a space for changing the orientation of the target article outside the second supporting member, and it is possible to realize a space-saving article loading facility.

It is also preferable that, if articles that are supported by the second supporting member include an article that is in the appropriate orientation and an article that is in the inappropriate orientation, the control unit preferentially selects the article in the appropriate orientation as the target article.

With this configuration, it is possible to preferentially take an article that is in the appropriate orientation out of the second supporting member compared to an article that is in the appropriate orientation by preferentially selecting an article that is in the appropriate orientation as a target article. That is, in the case where a target article is to be taken out of the second supporting member and loaded onto the first supporting member, the first transfer control is preferentially performed compared to the second transfer control, and therefore it is possible to reduce the time required to load a plurality of target articles onto the first supporting member.

It is also preferable that the second supporting member is formed so as to have a box shape with an open upper face.

With this configuration, due to side wall portions standing upright on the supporting portion, it is possible to prevent an article from falling off from the second supporting member when the article is loaded onto the supporting portion that constitutes the bottom surface of the second supporting member.

It is also preferable that the control unit performs, in addition to the first loading control and the second loading control, a third loading control that is to be performed when a target article that has been determined as an article in the inappropriate orientation by the determination unit is to be loaded onto the first supporting member while keeping the inappropriate orientation, the third loading control is performed to control the loading operation unit to suck and support the second sucking-target surface, which faces upward, of a target article that is supported by the second supporting member, from above, then move the sucking portion, and thereafter release the target article from the state of being sucked by the sucking portion when the target article is located immediately above the first supporting member and the second sucking-target surface faces upward, the determination unit performs a determination process to determine whether or not a target article that has been determined by the determination unit as being an article that is in the inappropriate orientation can be loaded onto the first supporting member in the inappropriate orientation, based on detection information obtained by the detection unit and information regarding a loading area of the first supporting member onto which an article can be loaded, if the determination unit has performed the determination process and has determined that the article cannot be loaded onto the first supporting member, the control unit performs the second loading control to control the loading operation unit to load the target article onto the first supporting member according to the orientation and the position indicated by the arrangement information, and if the determination unit has performed the determination process and has determined that the article can be loaded onto the first supporting member, the control unit performs the third loading control instead of the second loading control to control the loading operation unit to load the target article onto the first supporting member according to an orientation and a position that are different from those indicated by the arrangement information.

With this configuration, the determination unit performs a determination process to determine whether or not a target article that has been determined as being an article that is in the inappropriate orientation can be loaded onto the first supporting member in the inappropriate orientation. In this determination process, the determination unit compares the total volume of the plurality of target articles indicated by the arrangement information with the volume of the loading area of the first supporting member onto which articles can be loaded, based on the arrangement information and the volume of the loading area of the first supporting member onto which articles are to be loaded, and the determination unit can determine that the target articles that have been determined as being articles that are in the inappropriate orientation can be loaded onto the first supporting member in the inappropriate orientation if the total volume of the plurality of target articles is sufficiently smaller than the volume of the loading area. Alternatively, for example, the determination unit may determine that the target articles that have been determined as being articles that are in the inappropriate orientation can be loaded onto the first supporting member in the inappropriate orientation if it has been determined that there is a space on the first supporting member onto which articles in the inappropriate orientation can be loaded, based on the shape of each article in the inappropriate orientation indicated by the arrangement information, and the loading area of the first supporting member onto which articles can be loaded, immediately before the articles in the inappropriate orientation are loaded.

If the determination unit determines that the target articles, which have been determined by the determination unit as being articles that are in the inappropriate orientation, can be loaded onto the first supporting member, the control unit performs the third loading control. In the third loading control, there is no need for the loading operation unit to change the orientation of a target article from the inappropriate orientation to the appropriate orientation, and unlike in the second loading control, there is no need to perform an orientation changing process. Therefore, it is possible to reduce the time required to take the target article that is supported by the second supporting member out of the second supporting member and load the target article onto the first supporting member, and it is possible to smoothly load an article that is in the inappropriate orientation onto the first supporting member.

What is claimed is:

1. An article loading facility comprising:
   a loading operation unit that loads a plurality of target articles onto one first supporting member; and
   a control unit that controls the loading operation unit, wherein:
   the control unit controls the loading operation unit so that the plurality of target articles are loaded onto the first supporting member according to arrangement information that indicates the orientation and the position of each of the plurality of target articles relative to the first supporting member,
   a surface of a target article that faces downward when the target article is in the orientation indicated by the arrangement information is defined as a support-target surface, a surface of a target article that faces upward when the target article is in the orientation indicated by the arrangement information is defined as a first sucking-target surface, and an article that is in an orientation in which the support-target surface faces downward is defined as an article that is in an appropriate orientation,
   the loading operation unit includes: a sucking portion that sucks and supports a surface of a target article that is supported by a second supporting member; and an operation portion that moves the sucking portion,
   the article loading facility further comprises: a detection unit that detects the orientation of a target article that is supported by the second supporting member; and a determination unit that determines whether an article that is supported by the second supporting member is an article that is in the appropriate orientation or an article that is in an inappropriate orientation that is not the appropriate orientation, based on detection information obtained by the detection unit,
   the control unit performs first loading control that is to be performed when a target article that has been determined by the determination unit as being an article that is in the appropriate orientation is to be loaded onto the first supporting member in the appropriate orientation, and second loading control that is to be performed when a target article that has been determined by the determination unit as being an article that is in the inappropriate orientation is to be loaded onto the first supporting member in the appropriate orientation,
   the first loading control is performed to control the loading operation unit to suck and support the first sucking-target surface of a target article that is supported by the second supporting member, from above, then move the sucking portion, and thereafter release the target article from the state of being sucked by the sucking portion when the target article is located immediately above the first supporting member and the first sucking-target surface faces upward, and
   the second loading control is performed to control the loading operation unit to suck and support a second sucking-target surface, which faces upward, of a target article that is supported by the second supporting member, from above, then move the sucking portion so that the sucking portion performs an orientation changing operation to change the orientation of the target article from the inappropriate orientation to the appropriate orientation and change a surface that is to be sucked by the sucking portion from the second sucking-target surface to the first sucking-target surface, and thereafter release the target article from the state of being sucked by the sucking portion when the target article is located immediately above the first supporting member and the first sucking-target surface faces upward,
   the control unit performs, in addition to the first loading control and the second loading control, a third loading control that is to be performed when a target article that has been determined as an article in the inappropriate orientation by the determination unit is to be loaded onto the first supporting member while keeping the inappropriate orientation,
   the third loading control is performed to control the loading operation unit to suck and support the second sucking-target surface, which faces upward, of a target article that is supported by the second supporting member, from above, then move the sucking portion, and thereafter release the target article from the state of being sucked by the sucking portion when the target article is located immediately above the first supporting member and the second sucking-target surface faces upward,
   the determination unit performs a determination process to determine whether or not a target article that has been determined by the determination unit as being an article that is in the inappropriate orientation can be loaded onto the first supporting member in the inappropriate orientation, based on detection information obtained by the detection unit and information regarding a loading area of the first supporting member onto which an article can be loaded, if the determination unit has performed the determination process and has determined that the article cannot be loaded onto the first supporting member, the control unit performs the second loading control to control the loading operation unit to load the target article onto the first supporting member according to the orientation and the position indicated by the arrangement information, and if the determination unit has performed the determination process and has determined that the article can be loaded onto the first supporting member, the control unit performs the third loading control instead of the second loading control to control the loading operation unit to load the target article onto the first supporting member according to an orientation and a position that are different from those indicated by the arrangement information.

2. The article loading facility according to claim 1, wherein an external shape of the target article is rectangular parallelepiped shape, and the orientation indicated by the arrangement information is an orientation with which one of outer surfaces other than the largest outer surface of the target article faces downward.

3. The article loading facility according to claim 1, wherein:

an external shape of each article is rectangular parallelepiped shape, the operation unit is configured to change the orientation of the sucking portion to a first orientation in which the sucking portion sucks a surface of a target article that faces upward from above, and a second orientation in which the sucking portion has swung from the first orientation, about an axis that extends along a horizontal direction, and the orientation changing operation is an operation that is performed to change the orientation of the sucking portion from the first orientation, in which the sucking portion sucks the second sucking-target surface of a target article from above, to the second orientation, then release the target article from the state of being sucked by the sucking portion to change the orientation of the target article to the appropriate orientation while keeping the orientation of the sucking portion in the second orientation, and thereafter suck the first sucking-target surface of the target article that faces upward, using the sucking portion in the first orientation.

4. The article loading facility according to claim 1, wherein, if articles of the same type that are supported by the second supporting member include an article that is in the appropriate orientation and an article that is in the inappropriate orientation, the control unit preferentially selects the article in the appropriate orientation as the target article.

5. The article loading facility according to claim 1, wherein the second supporting member is formed so as to have a box shape with an open upper face, and in the second loading control, the orientation of the target article is changed from the inappropriate orientation to the appropriate orientation inside the second supporting member.

* * * * *